(12) United States Patent  
Dimitrovich et al.

(10) Patent No.: US 8,839,035 B1  
(45) Date of Patent: Sep. 16, 2014

(54) CLOUD-BASED TEST EXECUTION

(75) Inventors: Slavik Dimitrovich, Woodinville, WA (US); Venkata Uday Kumar Kalepalli Naga, Andhra Pradesh (IN); Siamak Irantash, Bothell, WA (US); Michael L Collado, Kent, WA (US); Vijay P Singh, Seattle, WA (US); Michael C. Moore, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 393 days.

(21) Appl. No.: 13/232,299

(22) Filed: Sep. 14, 2011

(51) Int. Cl.  
*G06F 11/00* (2006.01)

(52) U.S. Cl.  
USPC ................. 714/25; 714/26; 714/27; 714/38.1

(58) Field of Classification Search  
USPC ....................................... 714/25, 26, 27, 38.1  
See application file for complete search history.

(56) References Cited

U.S. PATENT DOCUMENTS

| | | | |
|---|---|---|---|
| 7,610,578 B1 * | 10/2009 | Taillefer et al. | 717/124 |
| 7,809,988 B1 * | 10/2010 | Portal et al. | 714/38.13 |
| 8,341,462 B2 * | 12/2012 | Broda et al. | 714/25 |
| 8,473,913 B2 * | 6/2013 | Noller et al. | 717/124 |
| 8,510,600 B2 * | 8/2013 | Broda et al. | 714/25 |
| 8,607,203 B1 * | 12/2013 | Mehra | 717/131 |
| 2008/0010543 A1 * | 1/2008 | Yamamoto et al. | 714/38 |
| 2009/0132856 A1 * | 5/2009 | Gorman et al. | 714/27 |
| 2011/0010691 A1 * | 1/2011 | Lu et al. | 717/124 |
| 2011/0231822 A1 * | 9/2011 | Sabin et al. | 717/124 |
| 2012/0017112 A1 * | 1/2012 | Broda et al. | 714/4.4 |
| 2012/0017210 A1 * | 1/2012 | Huggins et al. | 718/1 |
| 2012/0054551 A1 * | 3/2012 | Gao et al. | 714/38.1 |
| 2012/0059919 A1 * | 3/2012 | Glaser et al. | 709/223 |
| 2012/0331113 A1 * | 12/2012 | Jain et al. | 709/220 |
| 2013/0152047 A1 * | 6/2013 | Moorthi et al. | 717/124 |
| 2013/0191436 A1 * | 7/2013 | Chintalapati et al. | 709/201 |
| 2014/0026122 A1 * | 1/2014 | Markande et al. | 717/124 |

\* cited by examiner

*Primary Examiner* — Joshua P Lottich  
(74) *Attorney, Agent, or Firm* — Robert C. Kowert; Meyertons, Hood, Kivlin, Kowert & Goetzel, P.C.

(57) ABSTRACT

In some implementations, a testing service receives a test execution request for executing test operations on a test target. The testing service may map the test execution request to a particular type of supported test framework from among a plurality of types of supported test frameworks. The testing service may obtain a test package provided by a user that requested the testing, such as from a cloud storage location. The testing service determines a computing capacity for executing the testing and appropriates a plurality of workers in a cloud computing service. The testing service configures the plurality of workers for executing the test operations based on at least one of the test framework, the test execution request or the test package. The testing service provides test execution chunks from the test package to the plurality of workers for executing the testing on the test target.

25 Claims, 9 Drawing Sheets

|   | Browser Z | Browser Y | Browser X | Browser W | Browser V | Browser U | ... |
|---|---|---|---|---|---|---|---|
| OS A | 32 | 0 | 0 | 4 | 6 | 2 | ... |
| OS B | 2 | 4 | 1 | 1 | 1 | 0 | ... |
| OS C | 0 | 0 | 1 | 0 | 0 | 1 | ... |
| OS D | 0 | 0 | 27 | 7 | 5 | 3 | ... |
| OS E | 0 | 0 | 1 | 6 | 0 | 2 | ... |
| ... | ... | ... | ... | ... | ... | ... | |

CLOUD-BASED TEST EXECUTION

BACKGROUND

Testing of online components, such as websites, website features, web services, online applications, and the like, is typically carried out to ensure that the online components function in an expected manner. As one example, testing may verify that an online component performs as intended when interacting with various combinations of web browsers and operating systems, other online applications, and so forth. As another example, testing may include stress testing to determine how an online component performs under load from a large number of users. In general, most developers do not possess the capability to perform comprehensive testing of online components. Accordingly, testing software or a testing service may sometimes be employed to perform some testing of the online components.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Cloud-Based Testing

This disclosure includes techniques and arrangements for performing testing over a network. In some implementations, a user (i.e., a test requester) signs up to use a testing service and may send a test execution request to the testing service when the user is ready to have testing executed on a test target. The user may elect various levels of service, priority, timing, and the like, in connection with the requested test execution. In response to receiving the test execution request, the testing service may access or obtain a test package that can be executed by the testing service to test the test target. For example, the test package may be stored by the user in a cloud storage location and the testing service may retrieve the test package from the cloud storage. The testing service may map the test execution request and/or the test package to a supported test type or framework. The testing service may schedule the computing capacity necessary for conducting the testing and may execute the test package according to the timing, level of service, number of machines, and other test requirements of the user.

Some implementations provide a testing service that includes a cloud-hosted, auto-scalable test execution platform capable of executing tests developed by users of the testing service. The testing service may provide a scalable dispatcher-worker infrastructure. For example, one or more dispatchers may ensure that a requested number of workers are allocated and scheduled for performing a particular test. A worker manager may appropriate the requested number of workers from a cloud computing service and ensure that the workers are properly configured to perform the requested testing. For example, the workers may be configured with plug-ins for various standard supported test execution frameworks, such as TestNG, JUnit, Selenium, and so forth. Thus, for some supported test types, each browser configured in a worker may be configured with a plug-in for that test framework. Further, when requested by a user, the workers may be configured with various different combinations of operating systems (OSs) and web browsers, online applications, and so forth, for performing the testing.

The testing service may execute the testing at a scheduled time specified by the test execution request and as scheduled by the dispatcher. The dispatcher may provide test execution chunks to the worker manager, which may distribute the test execution chunks to appropriate workers for execution by the workers. For example, the tests may be executed on a designated OS/browser matrix in which the testing service automatically spawns a plurality of workers having a variety of different OSs and different browsers or online applications. Execution of the test instructions may cause the various different browsers or online applications to carry out functions simulating access and interaction with the test target, such as an online component of the user. Further, for some types of testing, a large number of actual or virtual machines may be allocated, such as for stress testing, which includes generation of a large service load on the test target.

In some implementations, the user may provide the testing service with one or more OS/browser images to be configured on one or more workers. For example, the test package or the test execution request provided by the user may include one or more OS/browser images to be configured on the workers. In other implementations, the user may merely specify desired OS/browser combinations to be used during the testing, and the worker manager automatically configures the workers according to the user's specifications. In yet other implementations, the user may elect to have a default matrix of OS/browser combinations applied to the workers. For example, the testing service may provide one or more default browser/OS matrices that represent a statistical distribution of browsers and OSs, such as for different geographic regions. The user may request that the testing service apply a particular default browser/OS matrix for a particular geographic region of interest when conducting the testing. For example, the statistical distribution may correlate to the actual distribution of OSs and browser types in the general population of a designated geographic region, such as North America, Europe, East Asia, India, Africa, South America, particular countries, particular languages, and so forth. The default browser/OS matrices may be updated periodically to reflect the latest statistical distributions, newly released versions of browsers or OSs, and so forth.

In some implementations, the dispatcher may instruct the worker manager to obtain and configure a desired number of workers with each OS/browser combination to be used for carrying out the testing. For example, each worker may be a single physical machine or may be a virtual machine running as one or more virtual machines on a physical machine. Thus, in some implementations, virtualization may be used for providing the workers for executing the testing. For example, to enable automatic scaling of a desired number of instances of machines with each OS/browser combination, a plurality of virtual worker machines may be instantiated. In the case in which a worker is a virtual machine, the worker may have a specified number of virtual cores, such as one, two or four virtual cores, a specified amount of memory, a specified amount of input/output (I/O) performance, and the like, as requested by the user, such as in the test execution request, the test package, or when the user signs up for the testing service.

Additionally, a monitoring component may monitor the operation and performance of the workers during execution of the testing. The monitoring component may notify the worker manager when a worker goes down or is not performing properly. In response to the notification, the worker manager may obtain additional capacity from the available raw capacity provided by the cloud computing service. The worker manager can configure a new worker with the same configuration as the malfunctioning worker and perform failover of the malfunctioning worker to the newly configured worker so that testing can be restarted or can continue with minimal disruption.

When the testing is complete, each worker may upload test results from the testing. In some implementations, each worker may store the test results directly to a cloud storage location. The testing service may also provide a notification or link to the user indicating the location and availability of the test results. For example, the user may include in the test instructions functionality to cause each worker to send a message to the user following the completion of each test or each portion of a test. Alternatively, an instance of a test execution module on each worker may upload the test results and/or send a notification to the user. As yet another alternative, the dispatcher may send a message to the user when the testing is complete. Further, the user may also perform local logging at the test target during the testing for obtaining target-side test results as well.

According to some implementations, the user may pay for the testing service based on an amount of testing service resources utilized. For example, if the user uses the equivalent of three machines for one hour, the user may only be billed for those three machine hours. Similarly, if the user uses the equivalent of three hundred machines for one hour, the user may be billed for three hundred machine hours. Further, the user may elect a higher priority in processing to execute the testing sooner or during a peak period, and thus be charged at a higher machine-hour rate than would be the case if the user elected a lower priority service in which the testing is carried out during non-peak hours. Additional pricing considerations can be based on particular OS/browser combinations requested, particular machine performance or configurations requested, and so forth.

Implementations herein can provide testing support for numerous different test execution frameworks, such as TestNG, Selenium, JUnit, multiple languages, etc. Further, implementations herein are not limited to system testing or testing that is executed in a browser, but can apply to other types of testing, including unit testing, integration testing and other functional testing. Thus, implementations are not bound to a specific testing framework or protocol between a worker and a test target. Accordingly, some implementations enable an entire testing life cycle of an online component to be automated and performed in the cloud, such as pre-alpha testing, alpha testing, beta testing, release-candidate testing and post-release testing.

Some implementations are described in the environment of testing online components, such as a website, website components, website features, web services, online applications, or the like. However, the implementations herein are not limited to the particular examples provided, and may be extended to other types of testing and other types of test targets, as will be apparent to those of skill in the art in light of the disclosure herein.

Example Architecture

Figure 1:
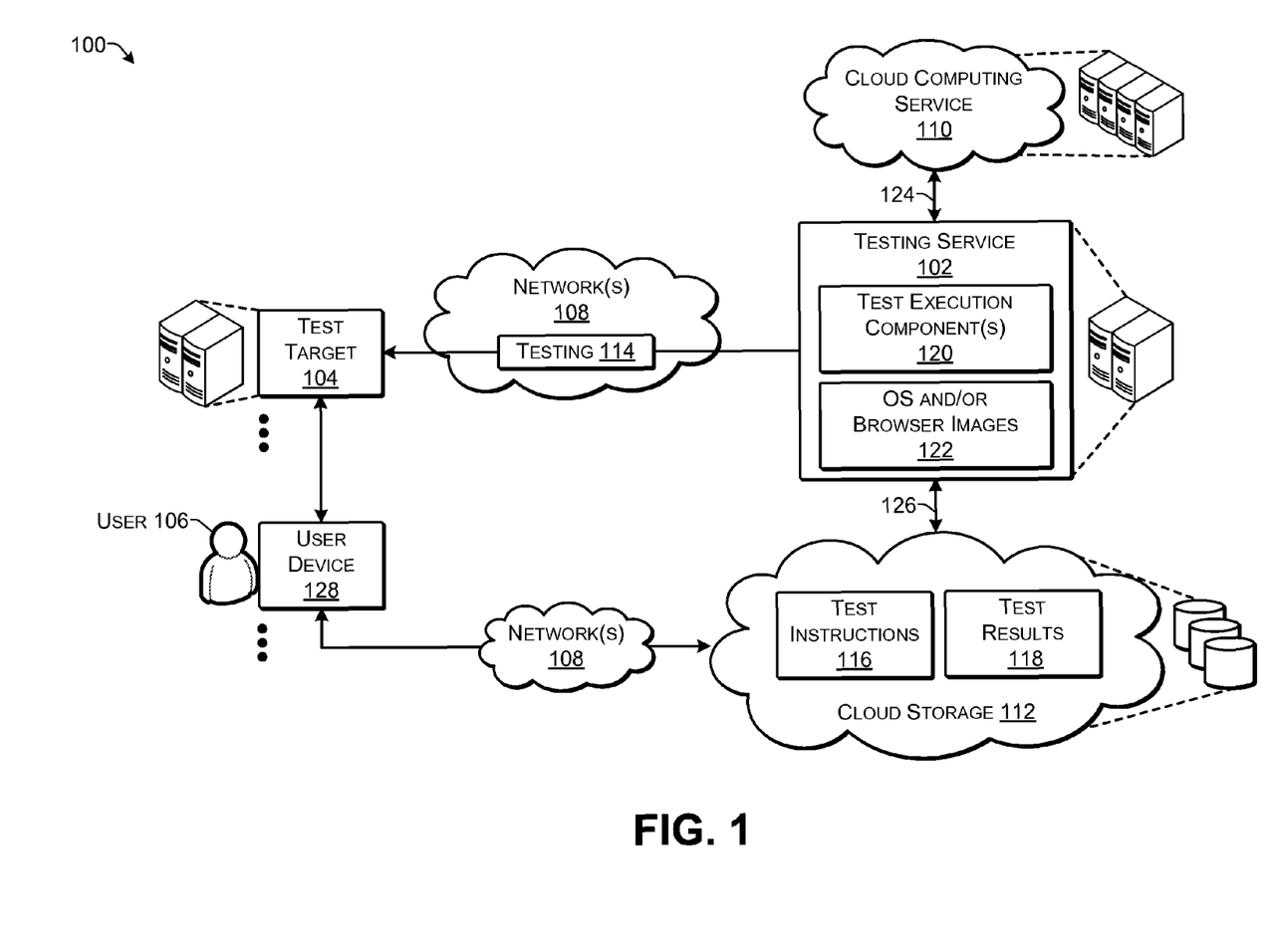
FIG. 1 illustrates an example architecture of a cloud-based system for executing testing over a network according to some implementations.

FIG. 1 illustrates an example architecture of a system 100 including a testing service 102 for executing testing according to some implementations. The testing service 102 is able to communicate with one or more test targets 104 and/or one or more users 106 through a network 108. For example, the network 108 may include a local area network (LAN), a wide area network (WAN), or any combination thereof, and may include both wired and wireless communication technologies using any suitable protocols and communication techniques. In some implementations, the network 108 may include the Internet, and the testing service 102, test target 104, and the user 106 may communicate and interact with one another using any combination of suitable communication and networking protocols, such as Internet protocol (IP), transmission control protocol (TCP), hypertext transfer protocol (HTTP) and so forth.

The testing service 102 may include or may be in communication with a cloud computing service 110 and/or a cloud storage 112. For example, the testing service 102 may be implemented on the cloud computing service 110 or may be implemented separately therefrom. In some instances, the cloud computing service 110 may include any suitable cloud computing service such as Amazon EC2®, Microsoft® Azure, Rackspace® Cloud Hosting, Google® App Engine, Storm® On Demand, or the like. Accordingly, in some implementations, the testing service 102 may be hosted on the cloud computing service 110 and may also utilize the cloud computing service 110 to obtain scalable computing capacity when executing testing 114 on the test target 104. In other implementations, the testing service 102 may be hosted separately from the cloud computing service 110, and may still utilize the cloud computing service's computing capacity for executing the testing 114. Furthermore, the testing service 102 may utilize the cloud storage 112 for obtaining test instructions 116, storing test results 118, and for other storage needs. The cloud storage 112 may include any suitable cloud storage service, such as Amazon® S3, Microsoft® Azure, Ubuntu® One, Dropbox®, or the like.

As one example, the user 106 may request that the testing service 102 execute testing on the test target 104. For example, the test target 104 may include a component, such as a website, a particular feature or portion of a website, a web service, an online application, or other component accessible over the network 108 for which the user 106 desires testing. As one example, the test target may be a recently developed website or portion thereof that the user 106 would like to test to ensure functionality. In some implementations, the test target 104 may be loaded onto one or more servers that are not publicly accessible or have a hidden location to provide pre-production testing of the component. In one example, the test target 104 may also be hosted on the cloud computing service 110 or another cloud hosting service.

In conjunction with requesting the testing, the user 106 may provide test instructions 116 that will be executed by the testing service 102 to perform the testing 114. For example, the user 106 may load the test instructions 116 into a location on the cloud storage 112. The testing service 102 may obtain the test instructions 116 from the cloud storage 112 and utilize one or more test execution components 120 and cloud computing service 110 to execute the test instructions 116 to conduct the testing 114 on the test target 104. In some implementations, in conjunction with conducting the testing 114, the testing service 102 may load particular OS and/or browser images 122 onto machines provided by the cloud computing service 110, and as specified in test instructions 116. For example, depending on the type of testing requested by the user 106, the test instructions 116 may be executed by the testing service 102 using a variety of different OS and browser combinations, the test instructions 116 may be executed to perform stress testing on the test target 104 using a large number of computing devices, and so forth.

During or after completion of the testing 114, the test execution component(s) 120 may store test results 118 obtained during the testing 114 in the cloud storage 112. The user 106 may access the cloud storage 112 to obtain the test results 118. Alternatively, depending on the size of the test results 118, the test results 118 may be delivered directly to the user 106, such as by e-mail or other suitable communication.

The testing service 102, the cloud computing service 110, and the cloud storage 112 may communicate with one another through one or more communication links 124, 126. Each of these communication links 124, 126 may be the same communication link or different communication links. For example, the communications links 124, 126 may be any of a direct connection, a LAN, a WAN, or any combination thereof, and may include both wired and wireless communication technologies using any suitable protocols and communication techniques. In some implementations, the testing service 102, cloud computing service 110, and the cloud storage 112 may be located at a data center, server farm or other single physical location, while the one or more users 106 access the testing service 102 over the Internet, such as through a user device 128. In other implementations, the testing service 102, cloud computing service 110, cloud storage 112, test target 104, user device 128 and/or user 106 may be located in diverse locations that are physically remote from one another, and the communication links 124, 126, and network 108 may include the Internet or other long distance communication network.

The user 106 may communicate with the testing service 102 through any suitable means such as through the user device 128, the test target 104, etc. In some instances, the user device 128 may be a computing device, such as a personal computer, server, laptop, mobile device, tablet device, or the like. The user device 128 may be at the same location as the test target 104, or may be geographically remote from the test target 104. For example, in some implementations, the test target 104 may be implemented in a cloud computing service, which may be the same cloud computing service 110 as used by the testing service 102, or a different cloud computing service. In other implementations, the test target 104 may be implemented on pre-production servers at a server farm, data center, or the like, owned by or used by the user 106. Thus, implementations herein are not limited to a particular location or configuration of the user 106, user device 128 and/or the test target 104.

Figure 2:
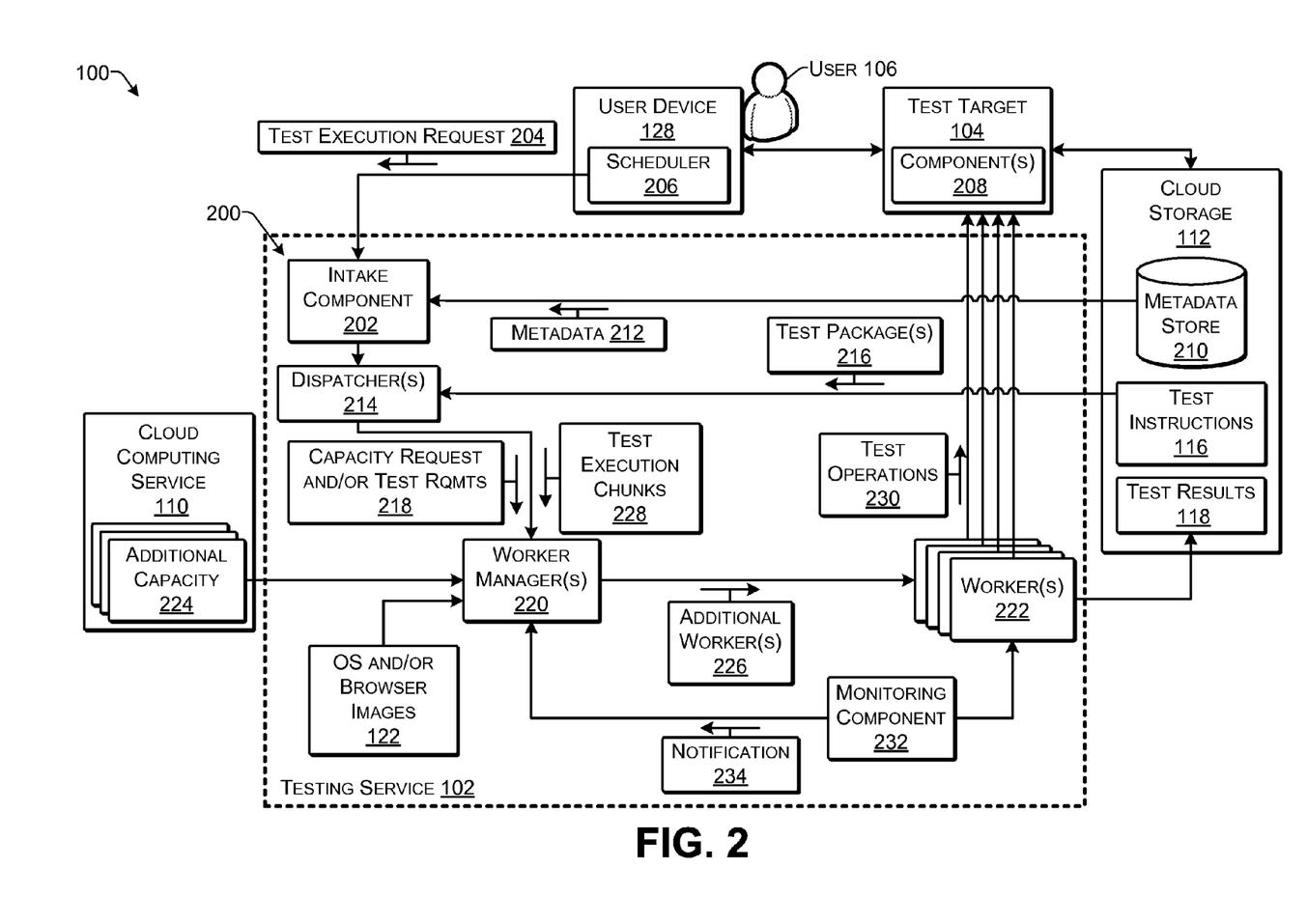
FIG. 2 illustrates example components of a testing service according to some implementations.

FIG. 2 illustrates an example framework 200 of the testing service 102 that may be included in the system 100 according to some implementations. In the example of FIG. 2, the testing service 102 includes an intake component 202 that receives a test execution request 204 for executing testing on the test target 104. For instance, the user device 128 may include a scheduler 206 that sends the test execution request 204 to the testing service 102 for conducting testing on one or more test target components 208 at the test target 104. Alternatively, the scheduler 206 may be located at the test target 104. As another alternative, the user 106 may manually send the test execution request 204. Still alternatively, the test execution request 204 may be generated by the intake component 202, such as based on a schedule previously established by the user 106. In some implementations, the test execution request 204 may specify a time at which the testing should be conducted, may specify testing parameters and configurations, may specify particular test packages to be executed, or the like.

In response to receiving the test execution request 204, the intake component 202 may access a metadata store 210 that contains test execution information or other testing-related information previously received from the user 106. For example, when the user 106 initially establishes a relationship with the testing service 102 for testing components 208 at the test target 104, the user 106 may provide the testing service 102 with contact information, billing information, the type and level of testing to be performed, the location of the test target 104, and so forth. In some instances, the metadata store is maintained in the cloud storage 112, while in other instances, the metadata store may be maintained in a local storage or memory of the testing service (not shown in FIG. 2), or other suitable storage location.

Further, the user may also load test instructions 116 into the cloud storage 112 at a specified location, and this location may also be included in the metadata store 210 so that the intake component 202 can determine the storage location in the cloud storage 112 from which to retrieve the test instructions 112. For example, as the user 106 develops new components 208, the user may load additional test instructions 116 into the cloud storage 112, and may send a corresponding test execution request 204 to the testing service 102 to conduct testing on the newly developed components 208.

The intake component 202 maps the test execution request 204 to a supported test type. For example, the testing service 102 may support a large number of test types including TestNG, Selenium, JUnit, and numerous other types of testing frameworks, protocols, programming languages, and the like. The intake component 202 may identify an appropriate dispatcher 214 corresponding to the type of testing be performed. For example, if the testing is to be performed using a TestNG framework, the intake component 202 forwards the test execution request 204 and corresponding metadata obtained from the metadata store 210 to a dispatcher 214 configured to perform testing within the TestNG framework. Similarly, if the testing is to be performed using a Selenium framework, the intake component 202 forwards the test execution request 204 and corresponding metadata 212 to a dispatcher 214 configured to perform testing within the Selenium framework. Accordingly, a variety of dispatchers 212 may be implemented in the system 100, each configured to perform testing within one or more testing protocols, frameworks or languages.

The dispatcher 214 receives the test execution request 204 from the intake component 202 along with the metadata 212 relevant to the test execution request 204. The dispatcher 214 interprets the test execution request 204 and the metadata 212 and identifies a location at which the test instructions 116 corresponding to the test execution request 204 are stored. For example, as discussed above, the test instructions 116 may be stored in the cloud storage 112 at a location indicated by the metadata 212 or the test execution request 204. From the test instructions 116, the dispatcher 214 may obtain one or more test packages 216 that include executable code to be executed for performing the testing on the test target 104. For example, the user 106 may upload a plurality of test packages 216 to the cloud storage 212 and may subsequently send one or more test execution requests 204 to the testing service 102 providing instructions to execute one or more selected test packages 216 of the plurality of test packages 216. Accordingly, the user 106 may utilize the scheduler 206 for sending sequential test execution requests 204 for executing a plurality of the test packages 216 in a desired order, at a desired timing, repeating tests, or the like. Alternatively, in some implementations, one or more test packages 216 may be included with the test execution request 204. Additionally, in some implementations, the intake component 202 may obtain the test package 216 from the cloud storage or may receive the test package with the test execution request 204, and the intake component 202 may pass the test package 216 to the dispatcher with the test execution request and the test metadata 212.

The dispatcher 214 determines from the test execution request 204 and/or the test package(s) 216 a number of tests or test suites that can be executed in parallel, and thereby is able to determine the machine capacity to be used for performing the testing in response to the test execution request 204. For example, suppose that the test package 216 indicates that a first test execution chunk of the test package 216 should be executed on a machine running Microsoft Windows® 7 as the OS and Internet Explorer® 9 as the browser, a next or second test execution chunk of the test package 216 should be executed on a machine running Windows® 7 as the OS and Mozilla Firefox® as the browser, a third test execution chunk of the test package 216 should be executed on a machine running Mac OS X Lion®, Version 10.7, as the OS and Safari® 5 as the browser, and so forth, for a number of different OS and browser combinations. The dispatcher 214 determines the machine capacity that will be used to execute the test package 216 and schedules execution of the test package 216. Thus, the dispatcher 214 may send a capacity request and/or test requirements 218 to an appropriate worker manager 220.

The worker manager 220 receives the capacity request and/or test requirements 218 from the dispatcher 214, and obtains the requested machine capacity from the cloud computing service 110. The worker manager 220 may be implemented by one or more machines at the cloud computing service 110 or may be implemented at separate location, such as when the testing service 102 is hosted separately. The worker manager 220 may locate the requested machine capacity by identifying idle workers 222 already allocated to the testing service 102. If there are insufficient idle workers 222 available, the worker manager 220 may request additional capacity 224 by requesting additional worker(s) 226 from the cloud computing service 110.

When the worker manager 220 has obtained the requested computing capacity, the worker manager 220 configures the workers 222 into the proper configurations for the test according to the test requirements. For example, in some implementations, the worker manager 220 may load one or more operating systems and/or browser images 122 onto the workers 222. In other implementations, the OS and/or browser may already be loaded onto the workers 222, and the worker manager 220 identifies and reserves the appropriate number of workers of each type of configuration desired for the test. When the worker manager 220 has reserved and configured the workers 222 according to the test specifications and requirements, the worker manager 220 schedules execution of the test and notifies the dispatcher 214 that the requested computing capacity has been obtained and is ready to execute the test.

In response, the dispatcher 214 forwards test execution chunks 228 to the worker manager 220, which provides each test execution chunk 228 to the appropriate or designated worker 222. The test execution chunks 228 may be blocks of executable code for performing at least a portion of the test. In some implementations, each particular worker 222 may each receive a particular test execution chunk 228 designated for that particular worker 222, such as based on the OS/browser configuration of the particular worker 222 or other testing considerations. The workers 222 execute the test execution chunks 228 to carry out test operations 230 on the one or more components 208 at the test target 104. During the testing, the workers 220 may log test results 118 that may be stored in the cloud storage 112, either during or following the execution each test execution chunk, or following completion of the test. In some implementations, one or more of the workers 222, the worker manager 220, or the dispatcher 214 may send a notification to the user 106 following completion of the testing to inform the user 106 that the testing is complete and to provide a location of the test results 118 for access by the user 106. For example, the notification may include a hyperlink to the storage location of the test results on the cloud storage 112.

Each worker 222 may monitor itself and report the ongoing status of the test operations 230 to the worker manager 220, which may in turn report the status of the aggregated status of the workers 222 to the dispatcher 214. In some implementations, the testing service 102 may further include a monitoring component 232 that monitors the workers 222 to identify any workers 222 that may go down or otherwise malfunction. When a malfunctioning worker 222 is identified by the monitoring component 232, the monitoring component 232 may send a notification 234 to the worker manager 220. The notification 234 may identify the malfunctioning worker 222 and a time at which the malfunction was detected. In response, the worker manager 220 may request or obtain an additional worker 226 from the additional capacity 224 of the cloud computing service 110. The worker manager may configure the additional worker 226 to have the same configuration as the malfunctioning worker 222, such as the same operating system and browser configuration. The worker manager 220 then performs failover from the malfunctioning worker to the newly configured worker and restarts the test execution chunk 228 designated for that worker. For example, the test may be started at the beginning of the test execution chunk 228, or, if possible, at a known point before the malfunction occurred.

Figure 3:
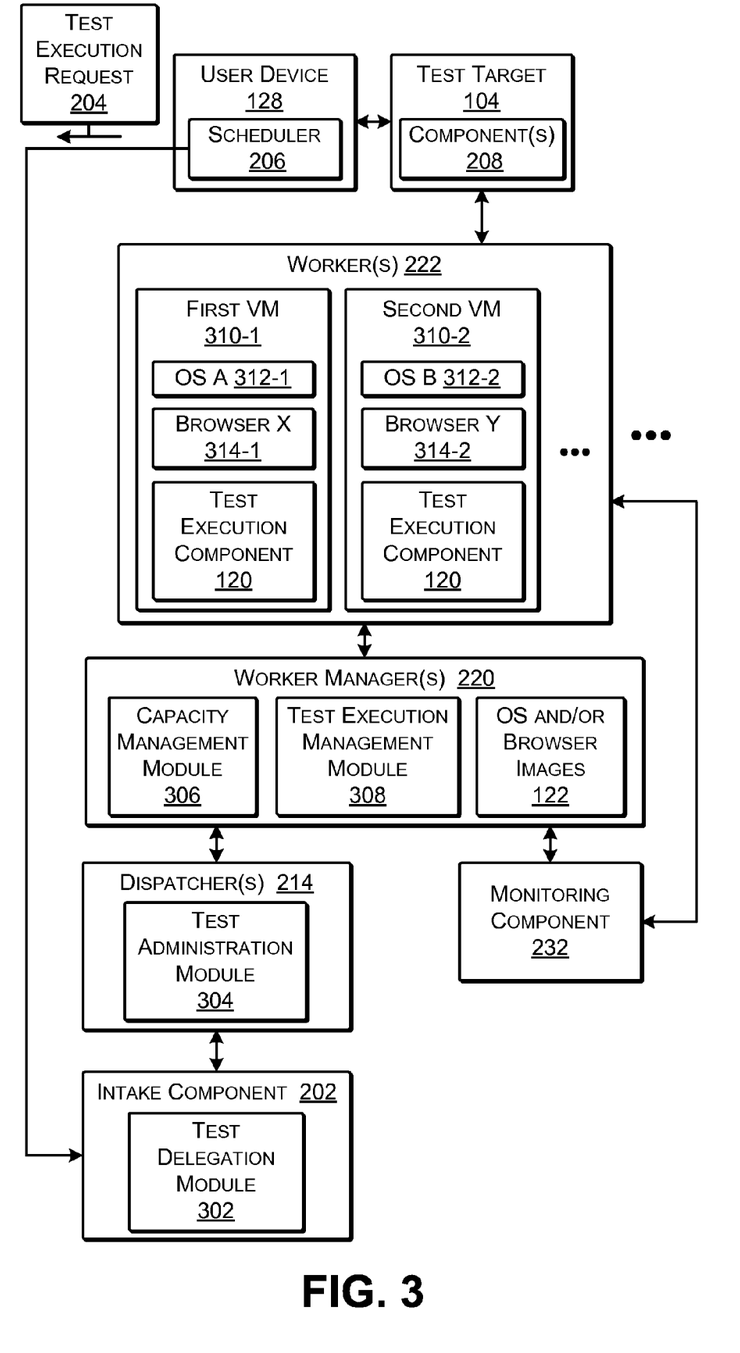
FIG. 3 illustrates example modules of the components of the testing service according to some implementations.

FIG. 3 illustrates example modules and components of the testing service 102 based, at least in part, on the system 100 and framework 200 described above according to some implementations. In the illustrated example, the intake component 202 includes a test the delegation module 302. The test delegation module 302 receives the test execution request 204 from the test target 104 and/or user 106, or generates the test execution request 204 internally. The test delegation module 302 may also obtain the corresponding metadata 212 from the metadata store 210. Test delegation module 302 maps the test execution request 204 to one of a plurality of supported test types and contacts a dispatcher configured to perform the identified type of testing corresponding to the test execution request 204. As mentioned above, there may be a plurality of differently configured dispatchers 214, each of which is specifically configured to administer testing of one or more particular test types, such as for a supported test framework or protocol. Further, as new test frameworks or protocols are developed, additional dispatchers may be added to the system 100 to handle those test types.

The selected dispatcher 214 may include a test administration module 304 that receives the test execution request 204 from the intake component 202 along with the corresponding metadata 212 for the test execution request 204. The test administration module 304 may further obtain one or more test packages 216 corresponding to the test execution request 204 and determine partitioning for the test, such as the number of test chunks that can be executed in parallel. The test administration module 304 may send a capacity request and/or test requirements 218 to one or more worker managers 220 to request the appropriate amount of machine capacity and to inform the worker manager 220 how to configure each worker 222.

The worker manager 220 may include a capacity management module 306 that receives the capacity request and/or test requirements 218 from the dispatcher 214 and that appropriates a corresponding number of worker computing devices to meet the capacity request. For example, the capacity management module 306 may locate idle workers 222 already allocated to the testing service 102, or may request additional workers from the cloud computing service 110. The worker manager 220 may further include a test execution management module 308 that configures the workers 222 according to the test requirements. For example, the test requirements may specify particular operating system and browser combinations for particular workers, may specify that the worker manager apply a default browser/OS matrix, or the like. In some instances, one or more OS/browser images may be provided by the user with the test package or test execution request. In addition, the worker manager 220 may have access to a plurality of OS and browser images 122 that can be installed on or provided to each worker 222 at the request of the user. Additionally, in some implementations, the workers 222 may already be configured with suitable OSs and browsers, in which case the capacity management module 306 appropriates workers 222 configured with desired OS and browser configurations when obtaining the requested machine capacity. Further, the test execution management module 308 may install an instance of a test execution component 120 on each of the workers 222. For example, the test execution component 120 may manage and monitor execution of the test on each worker 222, may communicate status of the test with the worker management 220, and so forth.

In some implementations, each worker 222 may be an individual physical computing device that may be configured by the test execution management module 308 in a configuration to match the test requirements. In other implementations, as illustrated in FIG. 3, virtualization may be utilized such that multiple workers 222 are configured on a single physical worker computing device. For example, a plurality of virtual machines 310, such as a first virtual machine 310-1, and a second virtual machine 310-2 may be generated on a single physical machine as workers 222. The first virtual machine 310-1 may be configured with an OS A 312-1 and the second virtual machine 310-2 may be configured with a different OS B 312-2. Further, a first browser X 314-1 may be configured on the first virtual machine 310-1, and a second browser Y 314-2 may be configured on the second virtual machine 310-2. Consequently, the test execution management module 308 may configure a plurality of workers 222, each capable of having a different OS and browser combination. In some implementations, the test requirements may specify particular browser and operating system combinations. However, in other implementations, the test execution management module 308 may apply a default browser/OS matrix as described additionally below. In some instances, each browser 314 may be configured with one or more plug-ins for particular test frameworks. For example, a plug-in may enable a browser to be controlled by test instructions in the test execution chunks. In other instances, the test execution component 120 may serve as the plug-in for controlling the browser during the testing. Other online applications may be installed on the OSs and tested in a manner similar to the browsers 314.

As mentioned above, the test execution management module 308 receives test execution chunks 228 from the test administrator module 304 and provides each of the test execution chunks 228 to the corresponding worker 222 configured to execute that chunk. The instance of the test execution component 120 on each of the workers 222 receives test execution chunk 228 from the test execution management module 308 and executes the test execution chunk on the worker 222. During the execution of the test, the test execution component 120 may monitor the status of the test execution, collect test results, and provide status updates to the test execution management module 308.

In addition, the monitoring component 232 may monitor each of the workers 222 and may notify the test execution management module 308 when a worker 222 goes down or appears to malfunction. The test execution management module 308 may request additional capacity from the capacity management module 306, configured the additional capacity as a new worker to replace the malfunctioning worker, and perform failover to the new worker to enable continuation or retry of the testing with minimal delay. In some implementations, the monitoring component 232 may be executed on the same machine as the worker manager 220 while in other implementations, the monitoring component 232 may be executed on a separate machine.

Example Default Browser/OS Matrix

Figure 4:
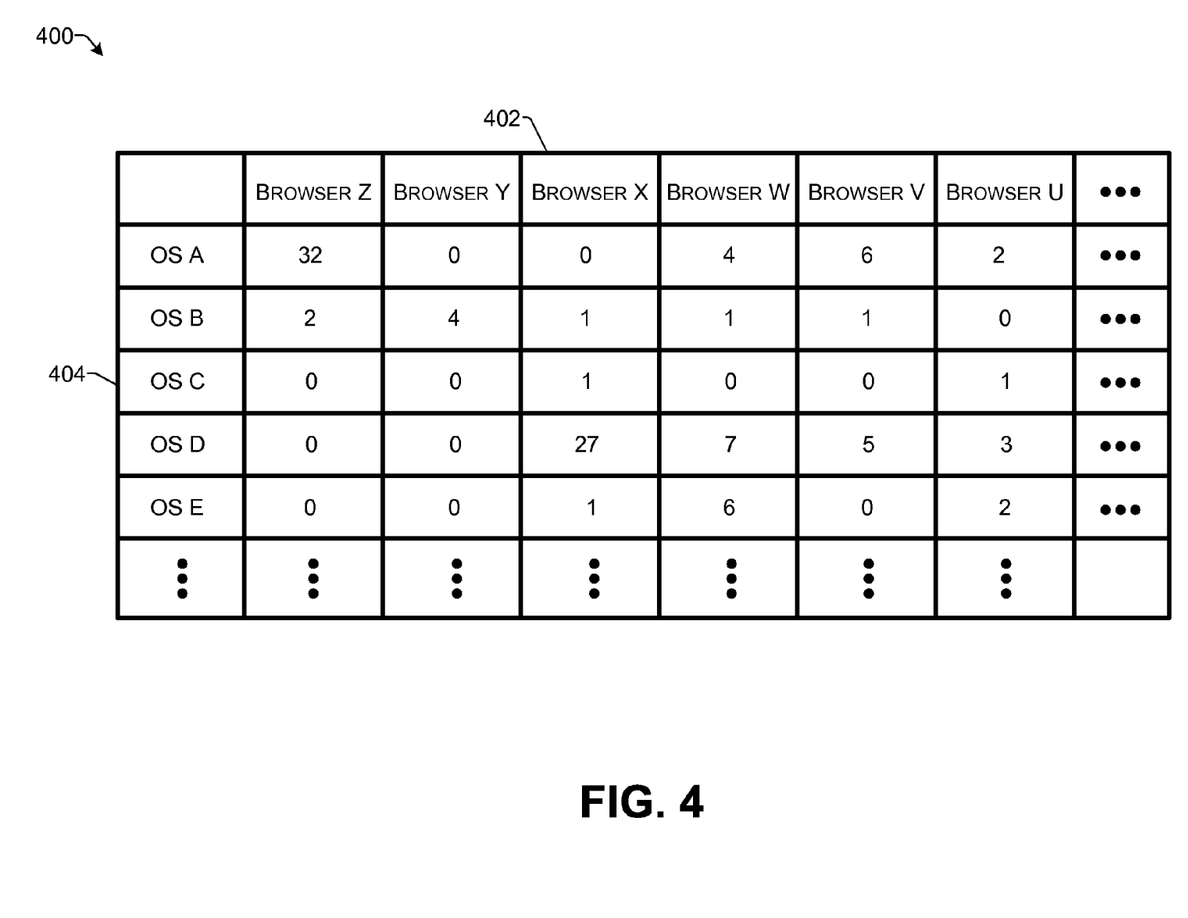
FIG. 4 illustrates an example default browser/OS matrix that may be applied for testing a component according to some implementations.

FIG. 4 illustrates an example default browser/OS matrix 400 according to some implementations herein. As is known in the art, a large variety of browser and OS combinations are possible. However, limited resources and limited budget may encourage users to test only those browser/OS combinations that are likely to be used with their online components. Accordingly, some implementations herein provide a default browser/OS matrix that indicates the likelihood that a particular browser and OS combination will be used by a member of the public. For example, the browser/OS matrix 400 may include a plurality of different browsers and browser versions 402, each of which may be considered as a separate browser for testing purposes. Similarly, the browser/OS matrix 400 may include a plurality of different operating systems and operating system versions 404, each of which may be considered as a separate OS for testing purposes.

The browser/OS matrix 400 may list, for each browser/OS combination, the current use or distribution among the general public of that particular browser/OS combination. For instance, the example browser/OS matrix 400 illustrated in FIG. 4 indicates that the most popular browser/OS combination is currently OS A and browser Z, which is used by 32 percent of the population within the geographic region to which the example browser/OS matrix 400 pertains. As one example of use, a user 106 may request that testing be performed for each browser/OS combination that is used by 2 percent or more of the population in the geographic region of interest to the user 106. Accordingly, by selecting a threshold or cutoff percentage to be applied to the default browser/OS matrix 400, users can ensure that their components are automatically tested using the most likely browser/OS combinations currently in use, without having to test each possible combination.

In some implementations, the test execution management module 308 may use the browser/OS matrix 400 when configuring the workers 222 to determine which browser/OS combinations to install on the workers 222. Further, in the case in which the user desires to conduct stress testing, the test execution management module 308 may use the browser/OS matrix 400 to configure a large number of workers 222 to reflect the distribution of browser/OS combinations of the general public in a particular geographic region of interest.

The statistical information maintained in the default browser/OS matrix 400 may be periodically updated as new operating systems and browsers are introduced or updated and as the usage statistics of the general population change. Further, it should be noted that more than one browser/OS combination may be used by certain individuals in the population and this also can be reflected in the statistical distribution provided in the browser/OS matrix 400. Additionally, different default browser/OS matrices 400 may be provided for different geographical regions of the world, such as for different countries, different continents, and the like depending on the actual distribution of operating systems and browsers in each of those regions. As one example, the browser/OS distribution in Russia may vary significantly from that in USA. Accordingly, testing of a website written in Russian and geared toward the Russian market may utilize a different default browser/OS matrix than testing of a website written in English and geared toward the US market. Similarly, default browser/OS matrices 400 may be generated based on other metrics or attributes, such as languages. For example, a component written in Japanese might be tested using a default matrix 400 representative of statistical distributions of browser/OS combinations among people that speak Japanese. Other variations will be apparent to those of skill in the art in view of the disclosure herein.

Example Processes

Figure 5:
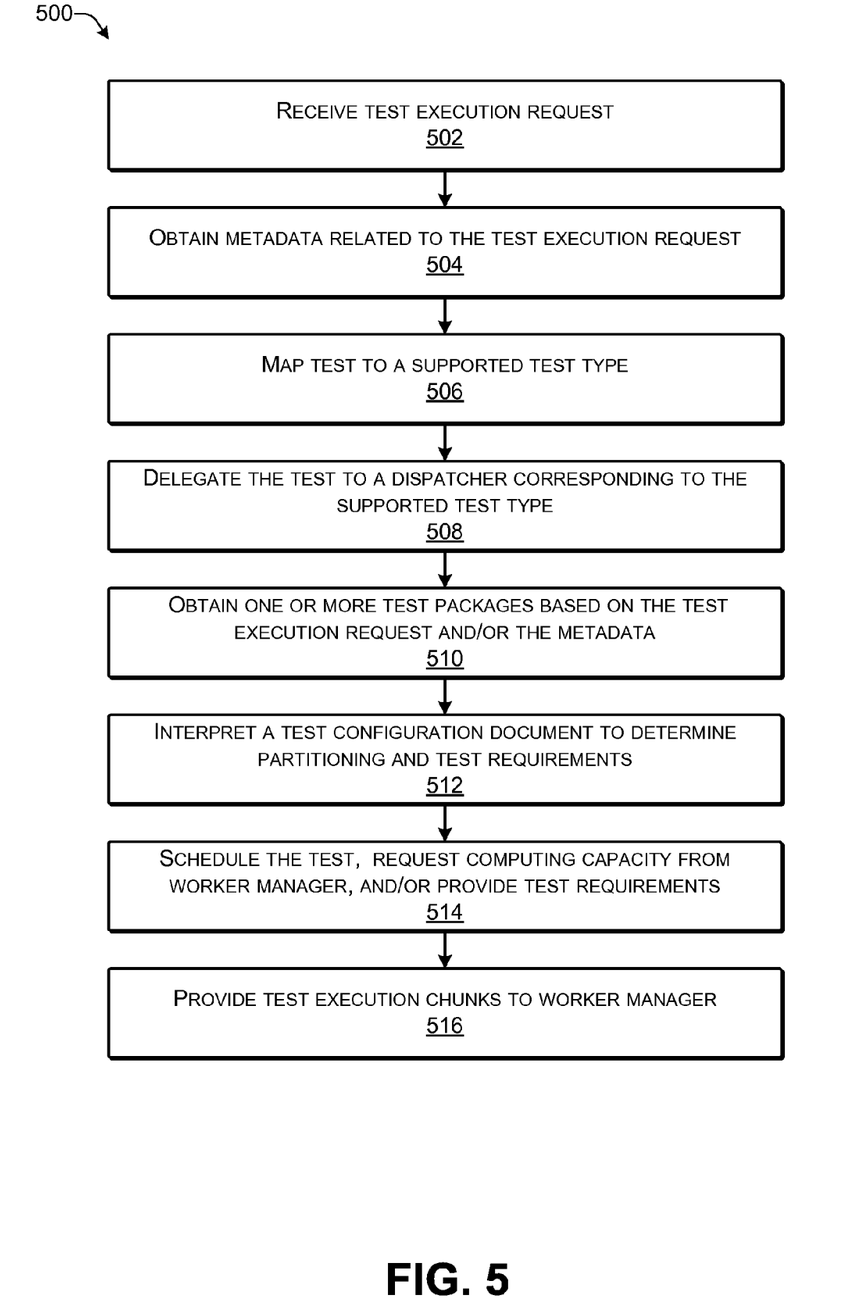
FIG. 5 is a flow diagram illustrating an example process for initiating testing of a test target according to some implementations.
Figure 6:
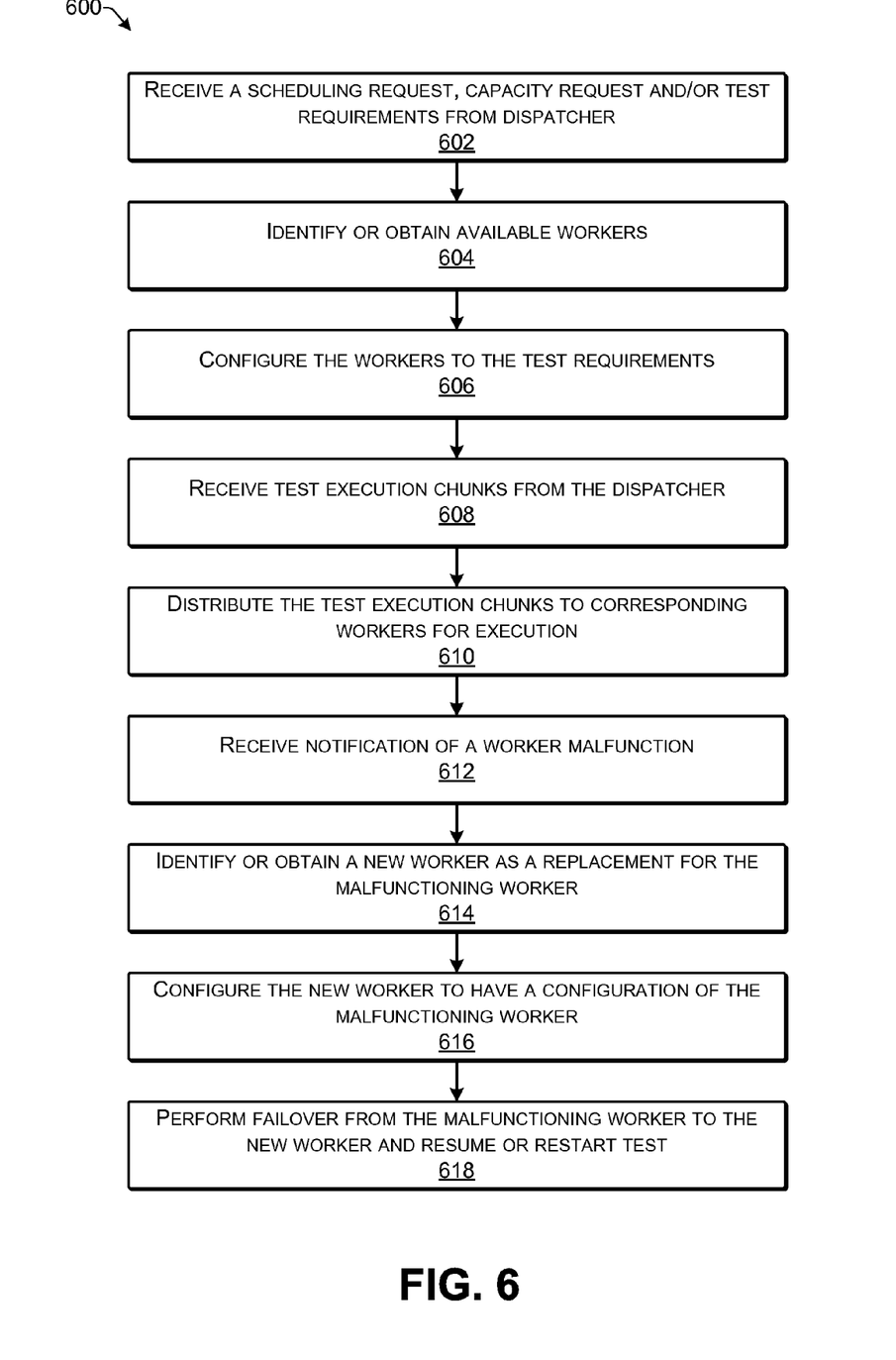
FIG. 6 is a flow diagram illustrating an example process for executing testing and performing failover according to some implementations.
Figure 7:
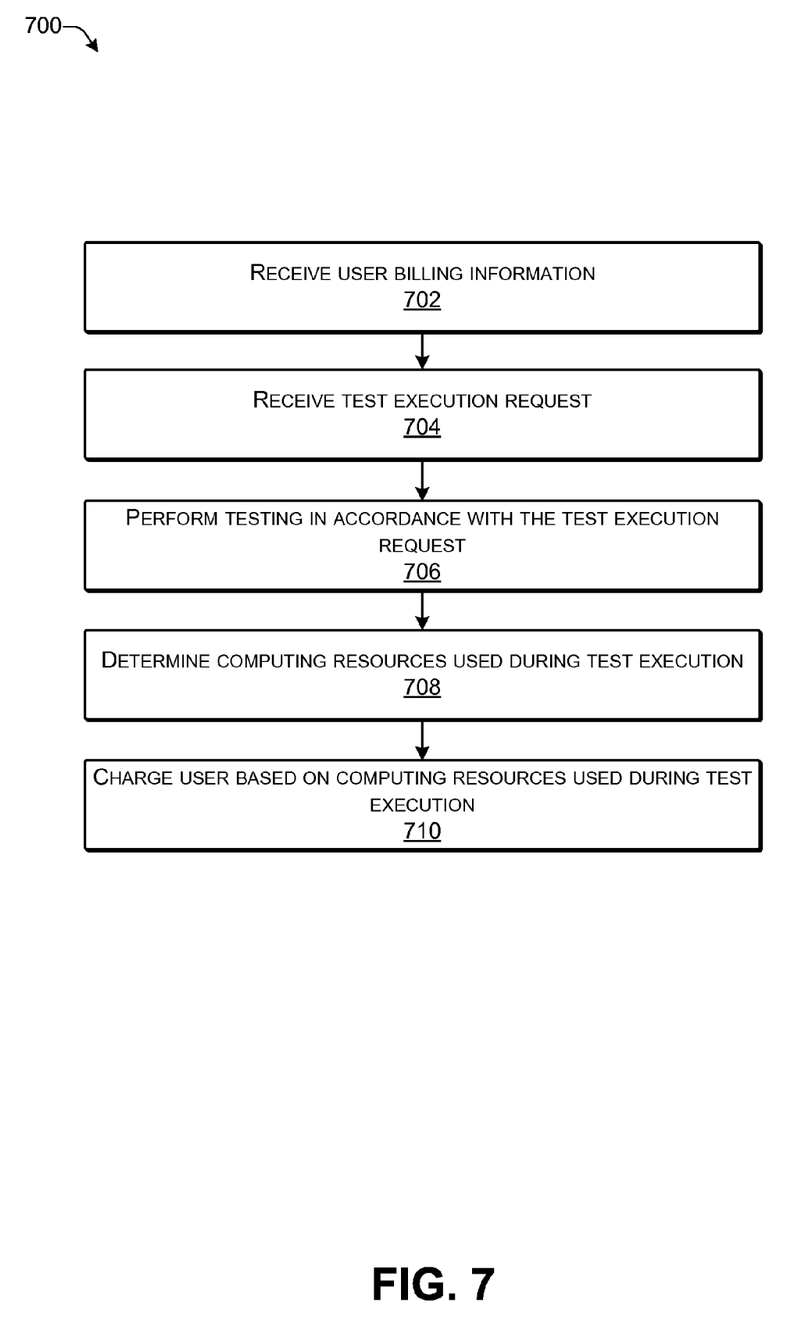
FIG. 7 is a flow diagram illustrating an example process for applying a revenue model according to some implementations.

FIGS. 5-7 illustrate example processes for implementing the techniques described above for providing the testing service 102. These processes are illustrated as a collection of operations in logical flow graphs, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures, frameworks and environments described in the examples herein, although the processes may be implemented in a wide variety of other architectures, frameworks or environments.

FIG. 5 is a flow diagram illustrating an example process 500 that may be executed by the testing service 102 for initiating testing according to some implementations herein.

At block 502, the testing service receives a test execution request to execute a test on a specified test target. For example, the test delegation module of the intake component may receive a test execution request from either a scheduler or a user. Alternatively, the test delegation module may generate the test execution request based on instructions previously provided by the user.

At block 504, the testing service obtains metadata related to the test execution request. For example, the user may have previously provided metadata related to the requested test, such as when signing up for the testing service. The metadata may provide information such as the location of the test target, the location of the test instructions to be executed, the identity of the user for billing purposes, and the like.

At block 506, the testing service maps the requested test to a test type supported by the testing service. For example, the test delegation module made utilize the test execution request and/or the corresponding metadata to identify the type of test requested and to map the requested test to a supported test type, framework, protocol, or the like.

At block 508, the testing service delegates the test to a selected dispatcher that corresponds to the supported test type. For example, the testing service may provide a plurality of differently configured dispatchers, each configured for a different type of test protocol or framework. The test delegation component may identify a particular dispatcher that corresponds to the identified test type and delegate the test execution request to that particular dispatcher.

At block 510, the testing service obtains one or more test packages corresponding to the test execution request. For example, the test administration component of the dispatcher may obtain one or more test packages containing executable chunks of code from a storage location specified by at least one of the test execution request or the corresponding metadata. For example, the storage location may be a cloud storage location at which the user has previously stored the one or more test packages.

At block 512, the test administration component may interpret a test configuration document to determine partitioning and test requirements. For example, a test configuration specification may be included with at least one of the test execution request, the test metadata or the test package. The test administration component may determine from the test configuration document the computing capacity to be used during the test and which portions of the requested test may be executed in parallel, in sequence, or the like.

At block 514, the testing service schedules the test, requests computing capacity from a worker manager and/or provides test requirements to the worker manager. For example, the test administration component of the dispatcher may schedule the testing with a worker manager, and may further request computing capacity and/or provide test requirements to the worker manager. In some implementations, the worker manager may operate within a cloud hosting or cloud computing service, and may be responsible for appropriating, scheduling, configuring and managing the workers for executing the requested test.

At block 516, when the worker manager has obtained and configured the workers for executing the requested test, the test administration component may provide the one or more test execution chunks to the worker manager, which distributes the test execution chunks to the appropriate workers for executing the testing.

FIG. 6 is a flow diagram illustrating an example process 600 that may be performed by one or more worker managers for executing testing according to some implementations.

At block 602, the worker manager receives a scheduling request, a capacity request, and/or test requirements from the dispatcher. For example, the test administration component at the dispatcher may schedule a requested test with the worker manager, provide an estimate of the required computing capacity for executing the test, and provide other test requirements, such as operating system and browser configurations to be used during the testing.

At block 604, the worker manager identifies or obtains available workers for conducting the testing. For example, if idle workers are already available, the capacity management module of the worker manager may appropriate these workers for the scheduled testing. Alternatively, if no idle workers are available, the capacity management module of the worker manager may request additional workers from the cloud computing service.

At block 606, the worker manager configures the workers according to the test requirements provided by the dispatcher. For example, the test execution management module of the worker manager may install an instance of a test execution component on each worker and may further configure each of the workers according to the test requirements, such as by installing images of one or more operating systems and browsers. In some implementations, the user may elect to use a default browser/OS matrix provided by the testing service for configuring the workers to be used during the test. For example, the user may elect to use the 10 or 20 most popular OS/browser combinations during the test, as specified by the default browser/OS matrix for a particular geographic region. Alternatively, in some implementations, the user may provide the OS and browser images to be configured on the workers. For example, the OS and browser images may be provided with the test execution request or the test package. Numerous other options are available as discussed above, depending on the type of testing being requested by the user.

At block 608, when the workers have been configured, the worker manager may receive one or more test execution chunks from the dispatcher. For example, each test execution chunk may be an executable block of code to be executed by one or more of the workers for conducting the test or a particular portion of the test.

At block 610, the worker manager may distribute the test execution chunks to corresponding workers. For example, different test execution chunks may be provided to different ones of the workers, depending on the configuration of the workers conducting the test. Thus, a first worker configured with a first OS and browser combination may receive a first type of test execution chunk, while a second worker configured with a second OS and browser combination may receive a second type of test execution chunk.

At block 612, the worker manager may receive notification of a worker malfunction. For example, a monitoring component may monitor the workers during execution of the testing, and may detect when a worker goes down or malfunctions. The monitoring component may send a notification to the worker manager regarding the malfunctioning worker.

At block 614, the worker manager identifies or obtains a new worker as a replacement for the malfunctioning worker. For example, if no idle workers are available, the capacity management component of the worker manager may request a new worker from the cloud computing service.

At block 616, the worker manager may configure the new worker to have a configuration matching that of the malfunctioning worker.

At block 618, the worker manager may perform failover from the malfunctioning worker to the new worker and may resume or restart the test. For example, the worker manager may determine the point at which the malfunctioning worker started to malfunction, provide the appropriate test execution chunk to the new worker, and so forth. The worker manager may instruct the new worker to execute the test execution chunk at a point in time prior to the point at which the previous worker malfunctioned, or in some implementations, may restart the test execution chunk from the beginning.

FIG. 7 is a flow diagram illustrating an example process 700 for applying a revenue model to the testing service 102 according to some implementations.

At block 702, the testing service receives user billing information. For example, a user that desires to use the testing service may sign up for an account and provide billing information to the testing service.

At block 704, the testing service receives a test execution request from the user. For example, a scheduler of the user may send the test execution request or the user may send the test execution request manually. In the test execution request, the user may elect various levels of service, priority, timing, and the like, in connection with the requested testing.

At block 706, the testing service performs testing in accordance with the test execution request. For example, the testing service may perform testing as described above with respect to FIGS. 1-6.

At block 708, the testing service may determine the computing resources used during the test execution. For example, the test administrator component on the dispatcher may track the computing resources used by the worker manager during execution of the test, such as the number of workers used, the length of time that the workers were used, and the like.

At block 710, the testing service bills the user based, at least in part, on the computing resources used during execution of the testing. For example, in some instances, the user is billed only for the computing resources used during execution of the testing. Further, the billing for the computing resources may further reflect various levels of service, priority, and timing elected by the user in connection with the requested testing. For example, if the user requests that the testing be performed within a specific time frame including peak hours, the user may be charged for computing resources at a higher machine-hour rate than if the user requests that the testing be performed during non-peak periods. Further, if the user requests a higher level of service, such as that multiple cores, additional memory, or high-speed communication ports be allotted to each worker, the user may be charged at a higher machine-hour rate. Additionally, in some implementations, a software configuration or licensing fee may be imposed, depending on the software requested by the user for the test execution. For example, if the user requests an unusual OS/browser configuration for one or more workers that requires manual configuration, an additional surcharge may be imposed.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Example Computing Devices

Figure 8:
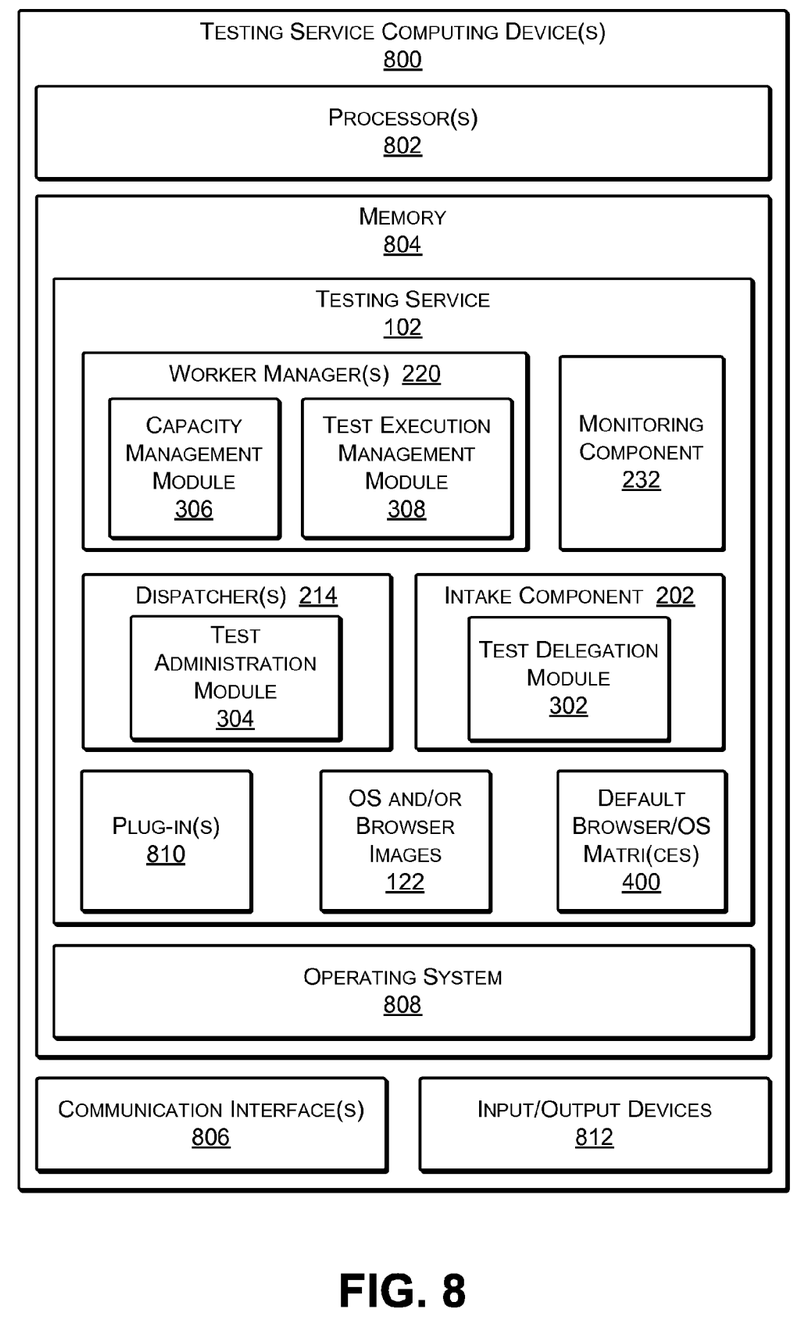
FIG. 8 illustrates select components of an example testing service computing device according to some implementations.

FIG. 8 illustrates select components of one or more testing service computing devices 800 that may be used to implement the functionality of the testing service 102 according to some implementations. For example, the testing service 102 may be hosted on one or more servers or other types of computing devices that may be embodied in any number of ways. For instance, in the case of a server, the testing service 102 may be implemented on a single server, a cluster of servers, a server farm or data center, a cloud hosted computing service, and so forth, although other computer architectures (e.g., a mainframe architecture) may also be used. Further, while the figures illustrate the components of the testing service 102 as being present in a single location, it is to be appreciated that these components may be distributed across different computing devices and locations in any manner. Generally, the testing service 102 may be implemented by one or more computing devices, with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

In the illustrated example, the testing service computing device 800 includes one or more processors 802, a memory 804, and one or more communication interfaces 806. The memory 804 may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium which can be used to store the desired information and which can be accessed by a computing device. Depending on the configuration of the computing device 800, the memory 804 may be a type of computer readable storage media and may be a non-transitory storage media.

The memory 804 may be used to store any number of functional components that are executable by the processors 802. In many implementations, these functional components comprise instructions or programs that are executable by the processors 802 and that, when executed, implement operational logic for performing the actions attributed above to the testing service 102. Functional components stored in the memory 804 may include the intake component 202, the test delegation module 302, the dispatcher(s) 214, the test administration module 304, the worker manager(s) 220, the capacity management module 306, the test execution management module 308 and the monitoring component 232, as described above, which may be executed on the processors 802 for implementing the various functions and features of the testing service 102 described herein. Additional functional components stored in the memory 804 may include an operating system 808 for controlling and managing various functions of the testing service computing device(s) 800. The memory 804 may also store the OS and/or browser images 122, one or more default browser/OS matri(ces) 400, and one or more plug-in(s) 810 that can be configured with various browsers and/or the test execution modules during execution of particular types of supported testing. The testing service computing device(s) 800 may also include many other logical, programmatic and physical components, of which those described above are merely examples that are related to the discussion herein.

The communication interface(s) 806 may include one or more interfaces and hardware components for enabling communication with various other devices, such as worker computing devices, test target computing devices, and/or user computing devices over communication links 124, 126 and network(s) 108. For example, communication interface(s) 806 may facilitate communication through one or more of the Internet, cable networks, cellular networks, wireless networks (e.g., Wi-Fi, cellular) and wired networks. Various different approaches to implementations described herein can be implemented in various environments. For instance, the communication links 124, 126 and network(s) 108 may include any appropriate network, including an intranet, the Internet, a cellular network, a LAN, WAN, VPN or any other such network or combination thereof. Components used for such a system can depend at least in part upon the type of network and/or environment selected. Protocols and components for communicating via such networks are well known and will not be discussed herein in detail.

Testing service computing device(s) 800 may further be equipped with various input/output devices 812. Such I/O devices 812 may include a display, various user interface controls (e.g., buttons, joystick, keyboard, touch screen, etc.), audio speakers, connection ports and so forth.

Figure 9:
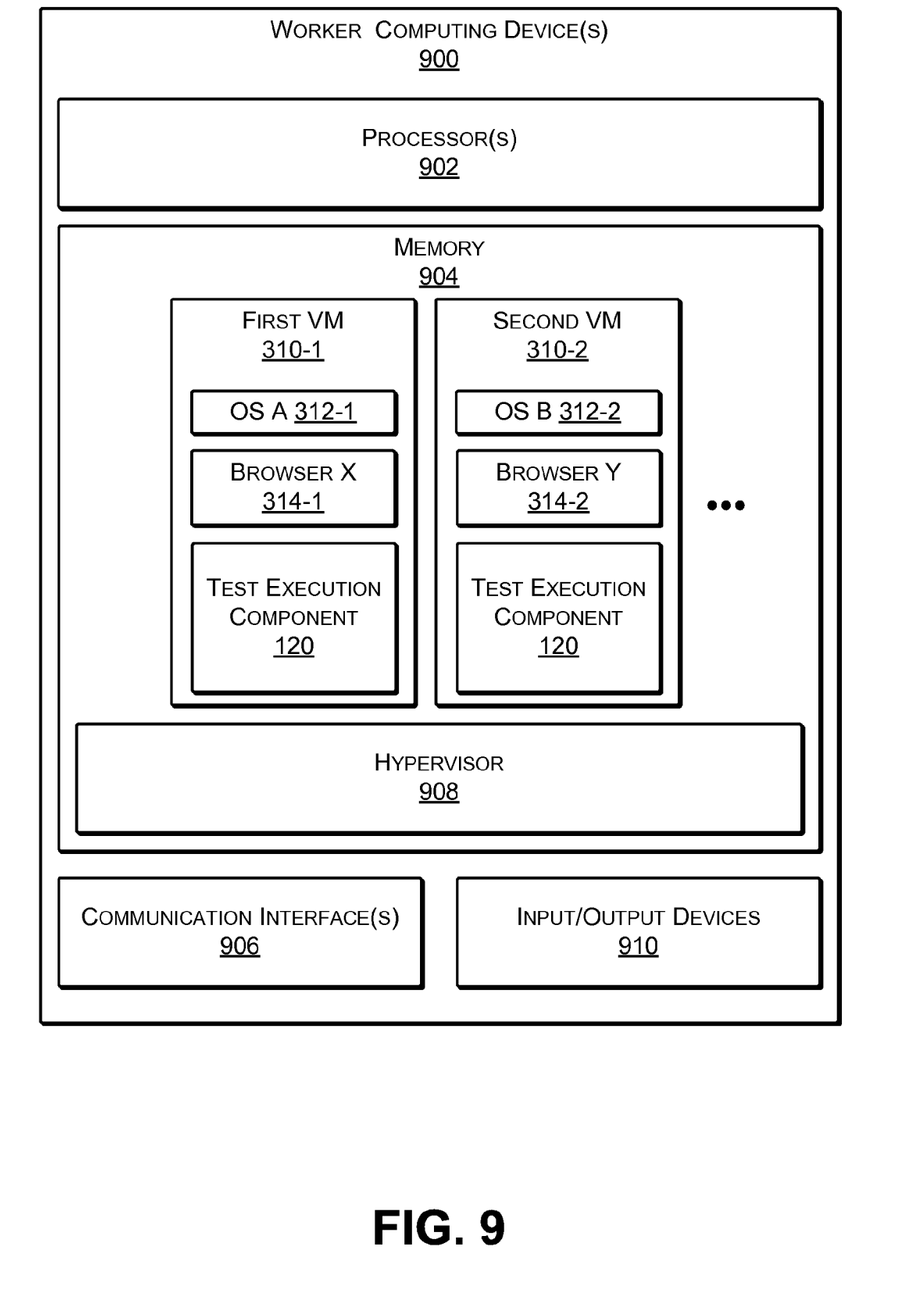
FIG. 9 illustrates select components of an example worker computing device according to some implementations.

FIG. 9 illustrates select components of one or more worker computing devices 900 that may be used to implement the functionality of the workers 222 described herein according to some implementations. For example, the worker computing device 900 in this example may correspond to one or more computing devices that implement the workers 222 and perform the testing on the test target as described herein. Further, other entities described herein, such as the worker managers 220, dispatchers 214, and intake component 202 may be implemented on virtual machines with similar hardware configurations, while containing different functional components. In the illustrated example, the worker computing device 900 includes one or more processors 902, a memory 904 and one or more communication interfaces 906. The processors 902 and the memory 904 may be any of the types of processors and memory described above with respect to processors 802 and memory 804, respectively.

The memory 904 may be used to store any number of functional components that are executable on the processors 902. In many implementations, these functional components comprise instructions or programs that are executable by the processors 902 and that implement operational logic for performing the actions attributed above to the workers 222. In addition, the memory 904 may store various types of data that are referenced by the executable components.

In some implementations, the memory 904 may maintain one or more virtual machines 310, such as the first virtual machine 310-1 and the second virtual machine 310-2 described above, each of which may correspond to a worker 222. In the illustrated example, the first virtual machine 310-1 includes the OS A 312-1, the browser X 314-1, and an instance of the test execution component 120. Similarly, the second virtual machine 310-2 includes the OS B 312-2, the browser Y 314-2 and an instance of the test execution component 120. Memory 904 may also store a hypervisor 908 that may generate and manage the virtual machines 310, and control the various functions of the worker computing device 900. Furthermore, while the illustrated example of FIG. 9 includes the use of virtualization for providing the workers 222, in other implementations, virtualization is not necessarily used and the hypervisor 908 may be replaced with an operating system 312 of a type desired to be used in the testing, with one or more browsers 314 also maintained in the memory 904.

The communication interface(s) 906 may include one or more interfaces and hardware components for enabling communication with various other devices, such as the testing service computing devices, the test target computing devices and the cloud storage 112 over communication links 124, 126 and/or network(s) 108. For example, communication interface(s) 906 may facilitate communication through one or more of the Internet, cable networks, cellular networks, wireless networks (e.g., Wi-Fi, cellular) and wired networks.

In some implementations, the worker computing device 900 may further be equipped with various I/O devices 910. Such devices may include a display and various user interface controls (e.g., buttons, joystick, keyboard, touch screen, etc.), audio speakers, connection ports and so forth. However, in other implementations, such I/O devices 910 are not used.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims

The invention claimed is:

1. A method comprising:
   under control of one or more processors specifically configured with executable instructions,
   receiving, by a testing service, a test execution request for executing test operations on a test target;
   mapping the test execution request to a supported test framework out of a plurality of supported test frameworks;
   obtaining a test package from a cloud storage location, the test package containing one or more test execution chunks;
   based on at least one of the test execution request or the test package, determining a computing capacity for executing the test operations;
   identifying a plurality of workers in a cloud computing service for use in executing the test operations based, at least in part, on the computing capacity determined for executing the test operations;
   configuring the plurality of workers for executing the test operations based on the supported test framework and at least one of the test execution request or the test package; and
   providing at least one of the test execution chunks to individual workers of the plurality of workers for executing the test operations on the test target.

2. The method as recited in claim 1, the configuring the plurality of workers further comprising configuring the plurality of workers with at least one operating system (OS) and at least one browser using an OS and browser image received with at least one of the test execution request or the test package.

3. The method as recited in claim 1, the configuring the plurality of workers further comprising configuring the plurality of workers with a plurality of different operating systems (OSs) and a plurality of different browsers based, at least in part, on a default browser/OS matrix providing a statistical distribution of browsers and OSs among a designated population or geographic region.

4. The method as recited in claim 3, wherein the test execution request establishes a threshold of statistical likelihood with respect to the default browser/OS matrix to limit a number of browser and OS combinations applied during the configuring the plurality of workers.

5. The method as recited in claim 1, the configuring the plurality of workers further comprising configuring the plurality of workers with one or more plug-ins for the supported test framework identified by the mapping.

6. A method comprising:
   receiving, via one or more computing devices, a capacity request and test requirements for executing testing on a test target;
   appropriating, via at least one computing device of the one or more computing devices, a plurality of workers in a cloud computing service for use in executing the testing based, at least in part, on the capacity request, wherein the appropriating comprises at least one of:
     appropriating idle workers already allocated in the plurality of workers; or
     requesting one or more additional workers from the cloud computing service join the plurality of workers;
   configuring, via at least one computing device of the one or more computing devices, the plurality of workers for executing the testing based, at least in part, on the test requirements; and
   providing, via at least one computing device of the one or more computing devices, at least one test execution chunk to individual workers of the plurality of workers for executing the testing on the test target.

7. The method as recited in claim 6, wherein:
   at least some of the workers are configured as virtual machines; and
   requesting the one or more additional workers results in allocation of one or more additional virtual machines at the cloud computing service.

8. The method as recited in claim 6, wherein the capacity request and the test requirements are received from a dispatcher, the dispatcher being configured for execution of a particular test framework from among a plurality of supported test frameworks.

9. The method as recited in claim 6, wherein the test execution chunks are distributed to particular workers of the plurality of workers based, at least in part, on particular configurations of the workers.

10. The method as recited in claim 6, further comprising:
    monitoring the workers during the testing; and
    sending a notification when a worker malfunction is detected.

11. The method as recited in claim 10, further comprising:
    in response to the notification of the worker malfunction, appropriating a new worker from the cloud computing service;
    configuring the new worker in a configuration of a malfunctioning worker; and
    performing failover from the malfunctioning worker to the new worker to resume the testing.

12. The method as recited in claim 6, the configuring the plurality of workers further comprising configuring at least some of the plurality of workers with at least one operating system (OS) and at least one browser using an OS and browser image provided by a user that requested the testing.

13. The method as recited in claim 6, the configuring the plurality of workers further comprising configuring the plurality of workers with a plurality of different operating systems (OSs) and a plurality of different browsers based, at least in part, on a default browser/OS matrix providing a statistical distribution of browsers and OSs among a designated population or geographic region.

14. The method as recited in claim 13, further comprising configuring the plurality of workers based, at least in part, on a threshold set by a user that requested the testing with respect to the default browser/OS matrix to limit a number of browser and OS combinations applied during the configuring the plurality of workers.

15. The method as recited in claim 6, further comprising:
   determining computing resources used during the testing; and
   billing a user that requested the testing based on the computing resources used during the testing.

16. The method as recited in claim 15, wherein the billing further takes into consideration at least one of:
   a number of cores requested by the user for one or more workers;
   an amount of memory requested by the user for one or more workers; or
   an input/output performance requested by the user for one or more workers.

17. The method as recited in claim 6, further comprising obtaining the test execution chunks from a cloud storage location.

18. One or more computing devices comprising:
   one or more processors;
   one or more computer-readable media;
   a plurality of dispatchers maintained on the computer-readable media and executed on the one or more processors, individual dispatchers configured to administer testing in a supported testing framework of a particular type from among a plurality of types of supported testing frameworks; and
   an intake component maintained on the computer-readable media and executed on the one or more processors to receive a test execution request and map the test execution request to a particular supported testing framework, the intake component further executed to pass the test execution request to a selected dispatcher corresponding to the particular supported testing framework,
   wherein the selected dispatcher is executed on the one or more processors to determine a computing capacity for performing the testing and sending a request for scheduling the computing capacity.

19. The one or more computing devices as recited in claim 18, further comprising a worker manager maintained on the computer readable media and executed on the one or more processors to:
   receive the request for scheduling the computing capacity; and
   appropriate the computing capacity from a cloud computing service.

20. The one or more computing devices as recited in claim 19, wherein the worker manager is further executed to:
   receive test requirements from the selected dispatcher; and
   configure the computing capacity at the cloud computing service as a plurality of workers according to the test requirements.

21. The one or more computing devices as recited in claim 20, further comprising a monitoring component maintained on the computer readable media and executed on the one or more processors to:
   monitor the workers during the testing; and
   notify the worker manager when a malfunction of one or more of the workers is detected.

22. The one or more computing devices as recited in claim 21, wherein the worker manager is further executed to:
   appropriate additional capacity from the cloud computing service in response to the malfunction of the one or more workers;
   configure one or more new workers in a configuration that matches the one or more malfunctioning workers; and
   perform failover to the one or more new workers to resume or restart the testing.

23. The one or more computing devices as recited in claim 18, wherein the intake component or the dispatcher is further executed to obtain a test package from a storage location indicated by the test execution request or by metadata associated with the test execution request.

24. The one or more computing devices as recited in claim 23, wherein the storage location is a cloud storage location accessible to a user and at least one of intake component or the dispatcher.

25. The one or more computing devices as recited in claim 23, wherein:
   the test package includes a plurality of test execution chunks; and
   the worker manager is further executed to receive the test execution chunks from the dispatcher and distribute particular test execution chunks to particular workers based on particular configurations of the particular workers.

* * * * *